United States Patent

[11] 3,607,296

| [72] | Inventor | Ryonosuke Abbe<br>Yokohama, Japan |
|---|---|---|
| [21] | Appl. No. | 773,672 |
| [22] | Filed | Nov. 5, 1968 |
| [45] | Patented | Sept. 21, 1971 |
| [73] | Assignee | Tempoku Chemical Co., Ltd.<br>Tokyo, Japan |

[54] METHOD FOR THE PREPARATION OF A FEEDSTUFF BY USING PEATMOSS AS A STARTING MATERIAL
2 Claims, No Drawings

[52] U.S. Cl. ........................................... 99/9,
99/2, 99/10
[51] Int. Cl. ............................................. A23k 1/14
[50] Field of Search........................................... 99/2, 9, 10;
162/92; 127/37, 46, 46.1, 46.2

[56] References Cited
UNITED STATES PATENTS

| 1,169,322 | 1/1916 | Delbruck...................... | 99/9 |
| 2,818,851 | 1/1958 | Khym et al.................... | 127/46 |

FOREIGN PATENTS

| 206,996 | 10/1955 | Australia...................... | 99/10 |

*Primary Examiner* — Lionel M. Shapiro
*Assistant Examiner* — Robert M. Elliott
*Attorney* — Wenderoth, Lind & Ponack ABSTRACT: This invention relates to a method for the preparation of a feedstuff using peatmoss as a starting material. The peatmoss is digested with calcium hydroxide in the presence of water to produce a pastelike product and a byproduct solution containing pentose. The pentose is converted into a complex compound of sodium borate and the complex compound is passed through an ion exchange resin for exchanging a complex ion by an anion which is ionically bonded to the ion exchange resin. The complex compound caught on the resin is recovered as a concentrated solution of pentose. The pastelike product is mixed with a diluted solution of pentose and the mixture is fermented by using a cellulose-decomposing bacterium to produce a feedstuff.

METHOD FOR THE PREPARATION OF A FEEDSTUFF BY USING PEATMOSS AS A STARTING MATERIAL

This invention relates to a method for the preparation of a feedstuff by using peatmoss as a starting material.

It is well known that the peatmoss was produced from some aquatic plants after they were rotted in water during a prolonged period of several thousand years. The resultant peatmoss is observed as a carbohydrate since its $\alpha$-cellulose content was decreased and its $\beta$-cellulose content was increased. From this point of view, it is considered likely that the peatmoss is a good feedstuff as it is. By the way, the peatmoss has high resistance against the action of micro-organisms and mold or mildew can not grow on the peatmoss. The reasons why the peatmoss has high resistance against the action of micro-organisms can not be fully illustrated but it seems to the inventor that the high resistance is resulted from the waxy materials contained in the peatmoss. The waxy materials are measured to be contained in an amount of from 8 to 16% in the peatmoss when it is extracted with benzol. The inventor considers that the peatmoss is provided with the walls consisted of the waxy materials preventing the growth of micro-organisms. This is an obstacle of the peatmoss which can not be used as a feedstuff.

A further obstacle of the peatmoss is the deficiency of calcium contained therein. It is measured that the replaceable calcium contained in the peatmoss is the 13.0 milliequivalent per 100 grams of peatmoss. It is natural that the domestic animals become calcium deficient when the animals were fed by the peatmoss as it is.

The peatmoss is a highly acidic material having the pH value of about 3.6 and the acidity of the peatmoss can not be neutralized completely by adding calcium hydroxide at room temperature because the neutralization reaction occurs on the surface of the peatmoss. This is considered to be based on the fact that the humic acid and amino acids contained in the peatmoss are also the basic compounds. Therefore, it is necessary to carry out the neutralization reaction at elevated temperatures by using a catalyst when it is desired to completely neutralize the acidity of the peatmoss by using the calcium hydroxide. The neutralization reaction does not proceed at a temperature below 100° C. but proceeds at that temperature by using a catalyst such as a caustic alkali substance. The acidity of the peatmoss can be completely neutralized by carrying out a liquid phase reaction by digesting the peatmoss with calcium hydroxide at a temperature ranging from 100° C. to 200° C., and preferably at about 140° C. under pressure. The digested product is a pastelike substance having pH value of 6.8. The pastelike substance is analyzed to contain 15.1% of ashes, 39.7% of cellulose material and 44.8% of a calcium salt of humic acid or lignic acid. The pastelike substance is quite different from the starting peatmoss and becomes a bait for the micro-organism so that mold or mildew can grow in the pastelike substance when it is allowed to stand for a short time in air. The pastelike substance contains the replaceable calcium in an amount of 101.4 milliequivalent per 100 grams of the pastelike substance and it can be used as the feedstuff for the domestic animals without causing calcium deficiency in the animals. Such pastelike substance, however, does not contain the high nutritious substances and hence, it is necessary to give the nutritive effect to the pastelike substance.

It is well known that the peatmoss contains about 1.2% of nitrogen in the form of pyran-type or furan-type ring compound and the ring structure of such a ring compound can be split when the ring compound is subjected to catalysis by using an alkaline earth metal as a catalyst.

The inventor considers that the nutritive effect of the peatmoss is improved if the ring compound can be converted into a nutritious substance by splitting the ring structure of the nitrogen-containing ring compound.

The inventor has found that the feedstuff containing a large amount of crude protein can be obtained by digesting the peatmoss with calcium hydroxide at elevated temperatures up to the critical temperature of 374.2° C. under pressure in the presence of water thereby to cause the splitting of the ring structure of the pyran-type or furan-type compound.

It is well known that about 10% of the organic substance contained in the dried peatmoss can be converted into pentose when the peatmoss is digested in water in the presence of calcium hydroxide. The resultant water liquor, however, has a low concentration of pentose and contains about 0.04% of pentose and therefore the water liquor must be concentrated by heating it. This heating procedure is not economical in preparing a concentrated pentose liquor.

In accordance with this invention, the pentose contained in a byproduct solution which is produced by digesting the starting raw peatmoss with calcium hydroxide in the presence of water is converted into a complex compound of sodium borate by mixing the byproduct solution with sodium borate. Then, the complex compound is passed through a base exchange resin, which is previously treated with hydrochloric acid, for exchanging a complex anion by an anion ionically bonded to the ion exchange resin. The complex anion caught on the resin is removed by treating it with hydrochloric acid and the pentose-boric acid complex anion is recovered as a concentrated solution, and simultaneously the resin is converted into an anion exchange resin to be reused. The complex anion is converted into a concentrated pentose solution and an alkyl ester of boric acid by mixing the complex anion with a lower aliphatic alcohol such as ethanol or methanol. The resulting alkyl ester of boric acid can be converted into sodium borate and then the sodium borate is reused.

In accordance with this invention, the pastelike substance as mentioned above is mixed with the concentrated pentose solution in an amount of 3% to 5% and then the resultant mixture is subjected to the fermentation procedure by using the cellulose-decomposing bacteria thereby to convert the cellulosic materials contained in the peatmoss into a reducing sugar.

The resultant product thus produced is found to be used as a feedstuff having a high nutritive effect.

This invention is illustrated by the following example.

The first step:

Peatmoss was mixed with calcium hydroxide, in the amount corresponding to a 5% by weight of CaO on the basis of the weight of peatmoss, in the presence of water. The aqueous mixture was subjected to a liquid phase reaction at 200° C. and 8 atmospheric pressures for 5 minutes thereby to form a pastelike product having a pH value of 6.8 to 7.2 and a sugar solution containing pentose as a byproduct.

The second step:

The resulting pentose solution was mixed with an aqueous solution of borax and the pentose was converted into a complex compound of sodium borate and pentose.

The third step:

The resulting solution of the complex compound was passed through an anion exchange resin, which is sold under the trade name of Dowex–50 in a HR form and is produced by treating a base exchange resin with hydrochloric acid, and a complex anion of the pentose-borate was exchanged with an anion of chlorine which is ionically bonded to the anion exchange resin. Thus, the complex anion was caught on the resin and the chlorine ion was chemically combined with $Na^+$, which is contained in the solution whereby it is converted into sodium chloride. The sodium chloride was removed from the reaction system.

The fourth step:

The complex anion caught on the resin was removed from the resin by treating it with hydrochloric acid, and the pentose-boric acid complex anion was recovered as a concentrated solution and also the resin was converted into an anion exchange resin.

The fifth step:

The concentrated solution containing the pentose-boric acid complex anion was mixed with methanol, and the boric acid anion was converted into a methyl ester of boric acid and the pentose was recovered as a concentrated solution. The resulting methyl ester of boric acid was converted into the borax and reused for carrying out the second step. Also, the recovered concentrated solution of pentose was diluted with water into the 5% concentration of pentose.

The sixth step:

One hundred parts by weight of the pastelike product obtained by the first step were mixed with 286 parts by weight of the 5% pentose solution obtained by the fifth step and the mixture was subjected to the fermentation procedure by maintaining the mixture at 30° C. with agitation for 10 days by using the cellulose-decomposing bacteria. After completion of the fermentation, the resultant product was dried and the dried product can be used as a powdered feedstuff. It was found that the product is analyzed as follows.

| Substances | Weight % |
| --- | --- |
| Moisture | 10.0 |
| Crude protein ($N=1.2\%$) | 27.5 |
| Crude fat | 2.0 |
| Crude ashes | 10.0 |
| Calcium oxide | 5.0 |
| Soluble carbohydrate | 30.9 |
| Crude cellulose matters | 14.6 |

What I claim is that:

1. A method for the preparation of a feedstuff using peatmoss as a starting material, comprising (1) digesting said peatmoss with calcium hydroxide at a temperature ranging from 100° C. to 374.2° C. under pressure in the presence of water to form a pastelike product and a sugar solution containing pentose, (2) separating the pastelike product and the sugar solution from the liquid reaction system, (3) converting the pentose into a complex compound of sodium borate by mixing the sugar solution with sodium borate, (4) passing a solution of the complex compound through an anion exchange resin thus exchanging the complex anion of the complex compound for an anion ionically bonded to the anion exchange resin, (5) recovering the complex anion by treating the resin with hydrochloric acid, (6) recovering the pentose as a concentrated solution by converting the complex anion into pentose and an alkyl ester of boric acid by mixing the complex anion with a lower aliphatic alcohol, (7) mixing the pastelike product with the pentose solution and a cellulose-decomposing bacteria, (8) and fermentating the resultant mixture with agitation.

2. A method as in claim 1 wherein the concentrated solution of step 6 is diluted prior to carrying out step 7.